United States Patent [19]

Kovaleski et al.

[11] Patent Number: 4,796,966
[45] Date of Patent: Jan. 10, 1989

[54] MAGNETICALLY ACTIVATED FIBER OPTIC SWITCH

[76] Inventors: Joseph G. Kovaleski, 41 Woodward Dr., New Haven, Conn. 06512; Thomas H. Arms, 44 Fort Hill Ave., Shelton, Conn. 06484

[21] Appl. No.: 122,479
[22] Filed: Oct. 27, 1987

Related U.S. Application Data

[63] Continuation-in-part of Ser. No. 900,807, Aug. 27, 1986, abandoned.

[51] Int. Cl.⁴ .............................................. G02B 6/36
[52] U.S. Cl. .................................... 350/96.2; 250/227
[58] Field of Search ................. 350/96.15, 96.2, 96.29; 250/227, 577

[56] References Cited

U.S. PATENT DOCUMENTS 3,836,958 9/1974 McMurtry ...................... 250/227 X
4,223,217 9/1980 Bongard et al. ..................... 250/227
4,397,183 8/1983 Ballon et al. ..................... 250/227 X
4,596,442 6/1986 Anderson et al. ................. 350/96.2

Primary Examiner—John D. Lee
Assistant Examiner—John Ngo

[57] ABSTRACT

A fiber optic switch is provided for regulating light transmission comprising an encasing movement body surrounding a paramagnetic shaft, a section of which protrudes therefrom. A spring member surrounds the shaft protruding from the encasing movement body. At the end of the shaft opposite that of the protruding section is a light intercepting surface alignable with an end surface of at least one optical fiber. When a magnet outside the encasing body approaches sufficiently close to the shaft, magnetic forces attract the shaft overcoming the restraining spring and cause the light intercepting surface to move out of alignment with ends of the optical fiber, thereby making or breaking a light circuit.

17 Claims, 3 Drawing Sheets

MAGNETICALLY ACTIVATED FIBER OPTIC SWITCH

This is a continuation-in-part of co-pending application Ser. No. 900,807, filed on Aug. 27, 1986, abandoned.

BACKGROUND OF THE INVENTION

1. Field of the Invention

The invention concerns a device for making or breaking a light path through a fiber optic circuit.

2. The Prior Art

Fiber optic circuits are recognized as desirable substitutes for the electrical type in areas where fire and explosion hazards exist. Consequently, fiber optic circuits have found utility in petrochemical plants, grain elevators, munitions plants, refineries, mines, ships and aircraft. One of the challenges in substituting fiber optic for electrical wire systems is the design of non-electrical switch mechanisms to regulate transmission of light.

Some electrical switches operate using the principles of magnetism. For instance, there are commercially available liquid level controllers sold by a number of companies including Thomas Products Ltd. and Transamerica DeLaval Inc. These devices comprise a magnetic fitted float pivotally attached to a housing containing an iron reed switch. The float is suspended in the fluid to be monitored. A rise in fluid level causes the float also to rise and eventually to magnetically influence the reed switch to activate an electrical circuit.

Often the fluids to be monitored contain organic solvent. Electrical connections, which are only partially avoided in the afore-described devices, have potential for igniting the solvent. Water based fluids, although non-flammable, can cause short-circuiting within the electrical connections. Fiber optic monitors would therefore be useful for such applications. It would also be desirable to generally utilize the principle of magnetism in the design of a fiber optic light regulator.

Consequently, it is an object of this invention to provide a device activated by a magnet for regulating light transmissions through an optical fiber.

A further object of this invention is to monitor a liquid level or liquid flow rate with a non-electrical switch based upon light transmission through an optical fiber.

A further object of this invention is to provide an optical fiber switch controlling machinery movement wherein a magnet activates a change in light transmission through the fiber optic.

These and other objects of this invention will become more apparent upon consideration of the following detailed description taken in conjunction with the accompanying drawings.

SUMMARY OF THE INVENTION

A non-electrical switch is disclosed for regulating passage of light through an optical fiber. The device comprises a shaft formed of paramagnetic material, its length describing a first and second section. An encasing body surrounds the first section of the shaft. At least one optical fiber communicates with the encasing body at a point remote from an exit point of the first shaft section. A light intercepting surface is attached to an end of the first shaft section. This intercepting surface is alignable with an end surface of the optical fiber.

In communication with the shaft is a spring member which returns the shaft from an activated to an at rest position. Under the influence of a sufficient paramagnetic force, the shaft will pivot toward the paramagnetic element positioned outside the encasing body and assumes the activated position. In the latter position, the light intercepting surface is drawn into or out of alignment with the end surface of the optical fiber.

BRIEF DESCRIPTION OF THE DRAWINGS

FIG. 6 is a force diagram showing the interaction between the float magnet, the shaft and the compression spring.

SPECIFIC DESCRIPTION

Figure 1:
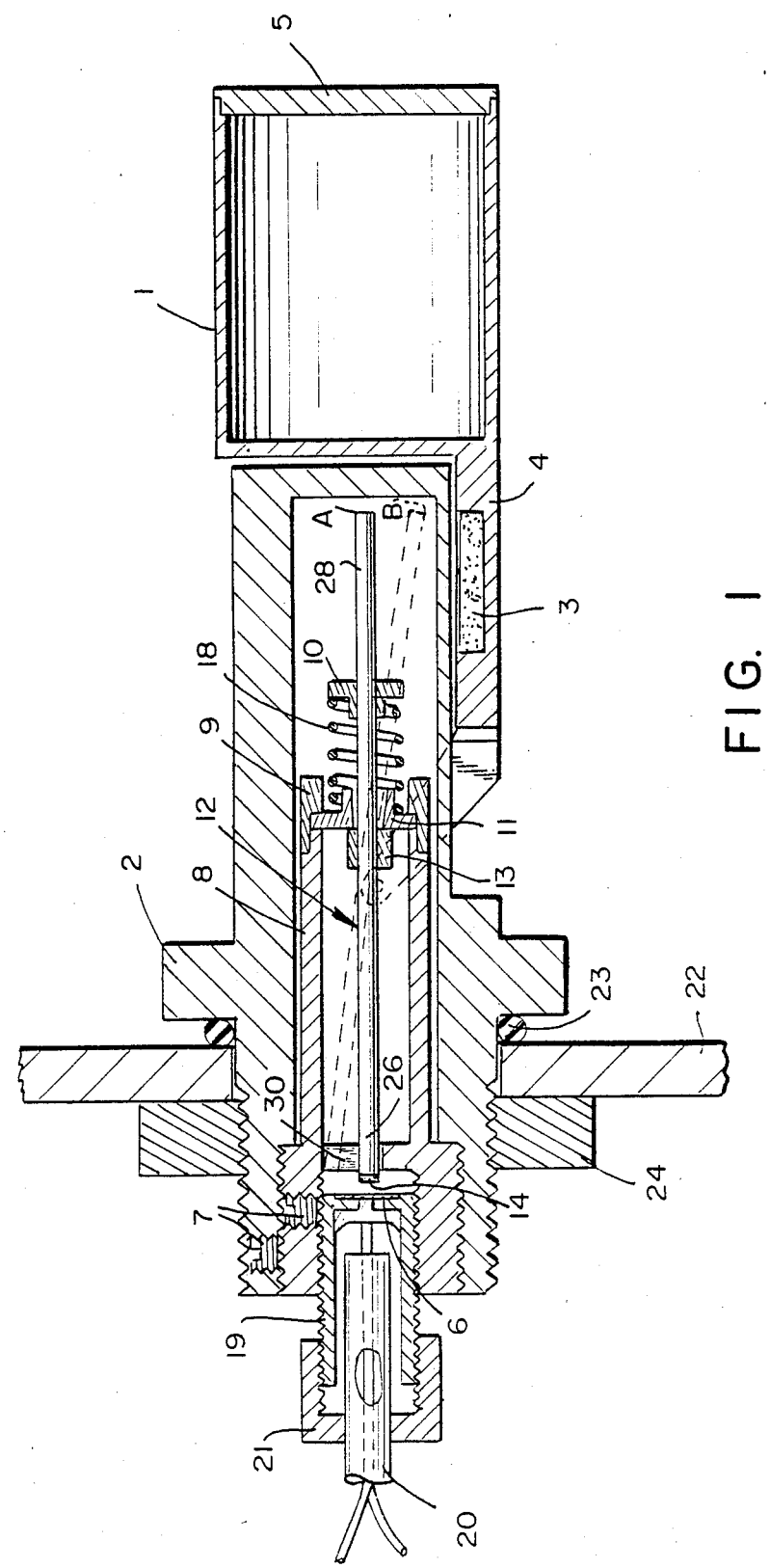
FIG. 1 is a side elevational view, partly broken away and partly in section, illustrating a preferred embodiment of this invention.

Represented in FIG. 1 is a switch for sensing the level of fluid in a vessel. This switch opens or closes a fiber optical light circuit when the fluid reaches a predetermined height. Two assemblies, a float 1 and a housing 2 comprise the switch. Float 1 is a hollow body sealed by plug 5 with an extension 4 hingedly connecting the float to the housing by means of pair of loose fitting pivots (not shown in figure). Embedded in the extension arm is a permanent magnet 3. When the housing is mounted on a tank wall 22, the float rises and falls with the level of fluid in the vessel by pivoting relative to the housing. Concomitantly, the embedded magnet undergoes identical movement.

Within the housing is a movement body 8 encasing a shaft 12 formed of paramagnetic material such as an iron rod. The shaft comprises a first and second section 26 and 28 respectively, wherein only the first section is encased by the movement body. Compression spring 18 surrounds at least a portion of the second section of the shaft at a point where the section protrudes from the movement body. One end of the spring is held in place by a spring stop 10 and the other end, adjacent the movement body, by a loose fitting pivot washer 11. Retainer 9 secures the pivot washer to the movement body 8. Inside the movement body is a collar stop 13 encompassing the first shaft section at a point adjacent to the pivot washer. A far end of the first shaft section opposite to that connecting with the second section passes through a groove 30 in the movement body. Attached to a face of this far end is a light intercepting surface 14 which in this embodiment is a reflector mirror.

A fiber optic coupling 19 is threadably mounted in the housing opposite the movement body. Fiber optic cable 20 is insertably held within the coupling and secured by connector 21. Set screws 7 fasten and align the coupling and, therewith, the fiber optic cable with surface 14. Light beams from the cable, when properly aligned, can be reflected back into the cable to close the circuit. An environmental shield 6, which may consist of a thin optically clear plastic film, is attached to the inside of the coupling to protect the movement from any contamination while shipping, handling or while installing the switch.

Operation of the switch depends on magnetic attraction between the magnetizable shaft and the float magnet. Position A of FIG. 1 depicts the shaft in its at rest position. Float 1 with its attached magnet 3 will approach housing 2 as the fluid level rises (cf. FIG. 3). When magnet 3 is sufficiently close, magnetic attractive forces will overcome the compression spring force and pivot the shaft to an activated position B. Similarly, when the magnet moves away, the magnetic force is weakened until the spring prevails returning the shaft to its at rest position A. As shown in FIG. 6, as the float 1, rises the force due to the magnetic attraction between the shaft 12 and the float magnet 3 (see curve I) increases. To move the shaft 12 into the "tripped" position, the magnetic force (curve I) must overcome the spring force curve II) exerted by the compression spring 18. Point "C" on curve II indicates the spring force in pounds which must be overcome. To reach the spring force indicated by point "C", the float 1 must move the float magnet 3 to a location which will equal point D on curve I. Once the magnetic force exceeds that indicated by point "C" (the spring force) on curve II, the shaft 12 will be forced to the position indicated by point "E" on curve II. Once the shaft 12 is in position indicated by point "E", it will remain there until the float magnet 3 moves away from the shaft 12. When float magnet 3 reaches a position indicated by point "B" on curve I, the spring force will overcome the magnetic force and the shaft 12 will "snap back" to an open position. The difference in position of the float magnet 3 indicated by points "D" and "B" is the differential motion of the switch location of magnetic and magnetizable material. Thus, shaft 12 may be a magnet while 1 may merely be magnetizable.

Actual shaft movement, it must be emphasized, is slightly more complicated than depicted in FIG. 1. It is important to this invention that slight movement of the magnet not cause a similar movement of the shaft. Attractive forces between magnet and iron shaft are inversely proportional to the distance between them. There cannot be a movement continuum but, rather, the shaft must either be at rest (A) or activated (B) to prevent generation of a false signal. As the magnet moves closer to the shaft, its pull increases. At some point, the magnetic attraction of the shaft overcomes the force of return spring 18. The shaft then abruptly moves toward the magnet into its activated position without any further motion of the magnet.

In its activated position the shaft is held securely by the magnet because of the shortened distance between them. As the magnet moves away, the shaft will remain activated until the point where the distance between the magnet and iron shaft is such that the magnetic attraction between them is overcome by the return spring. The shaft then returns to its rest position without any further motion of the magnet. The distance between the two positions of the magnet measured at the center of buoyancy of the float motion is the distance between where the switch turns on and where the switch turns off. In practice, many adjustments can be made to change the differential motion of the switch. Magnet strength, size and placement; float size, shape and density; and spring rate and preload all are critical parameters.

The foregoing spring mechanism provides for a differential operating motion and snap action switching. The overall design is simple and uses a limited amount of moving parts. Any movement of the shaft which does occur is minimal. Flexation of the spring also occurs only over a very small portion of its length. These attributes allow the switch to have a life in the millions of cycles.

Figure 2:
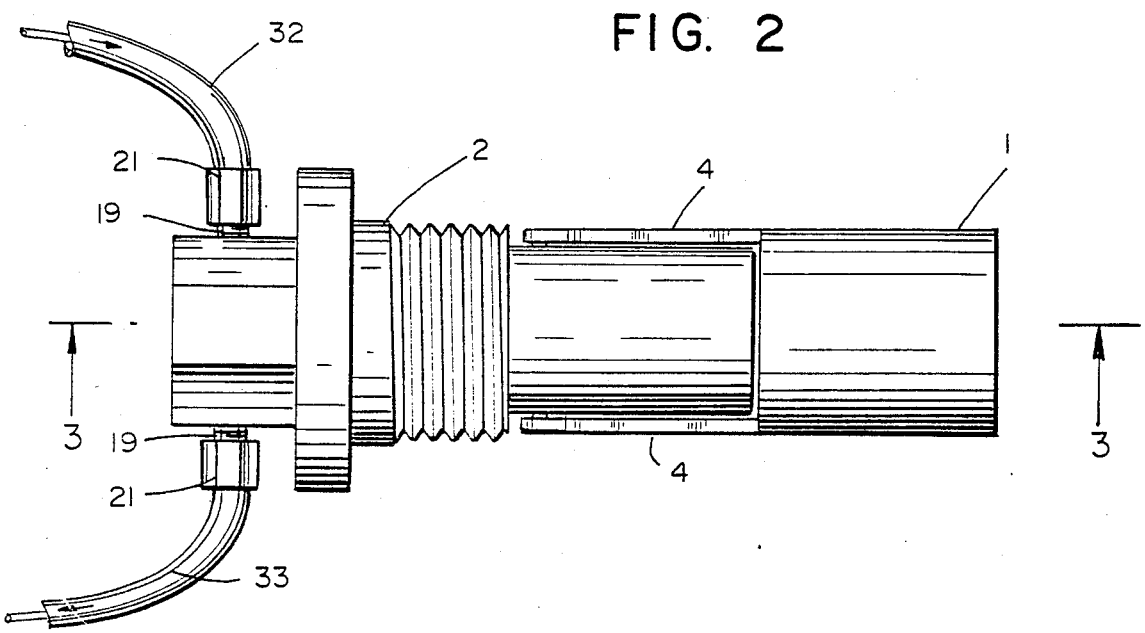
FIG. 2 is a top plan view of the preferred embodiment of FIG. 1, except herein the optical fiber enters the housing perpendicular to the orientation of the shaft.

In an alternate design, an opaque shutter can be attached to the shaft in place of the reflector. In this way, the light that passes between two aligned fiber optic cables can be controlled. Thus, the switch can be made with a single cable fiber, two cables, or a duplex cable where both fibers are terminated in the same connector. FIG. 2 depicts this alternate design.

Figure 3:
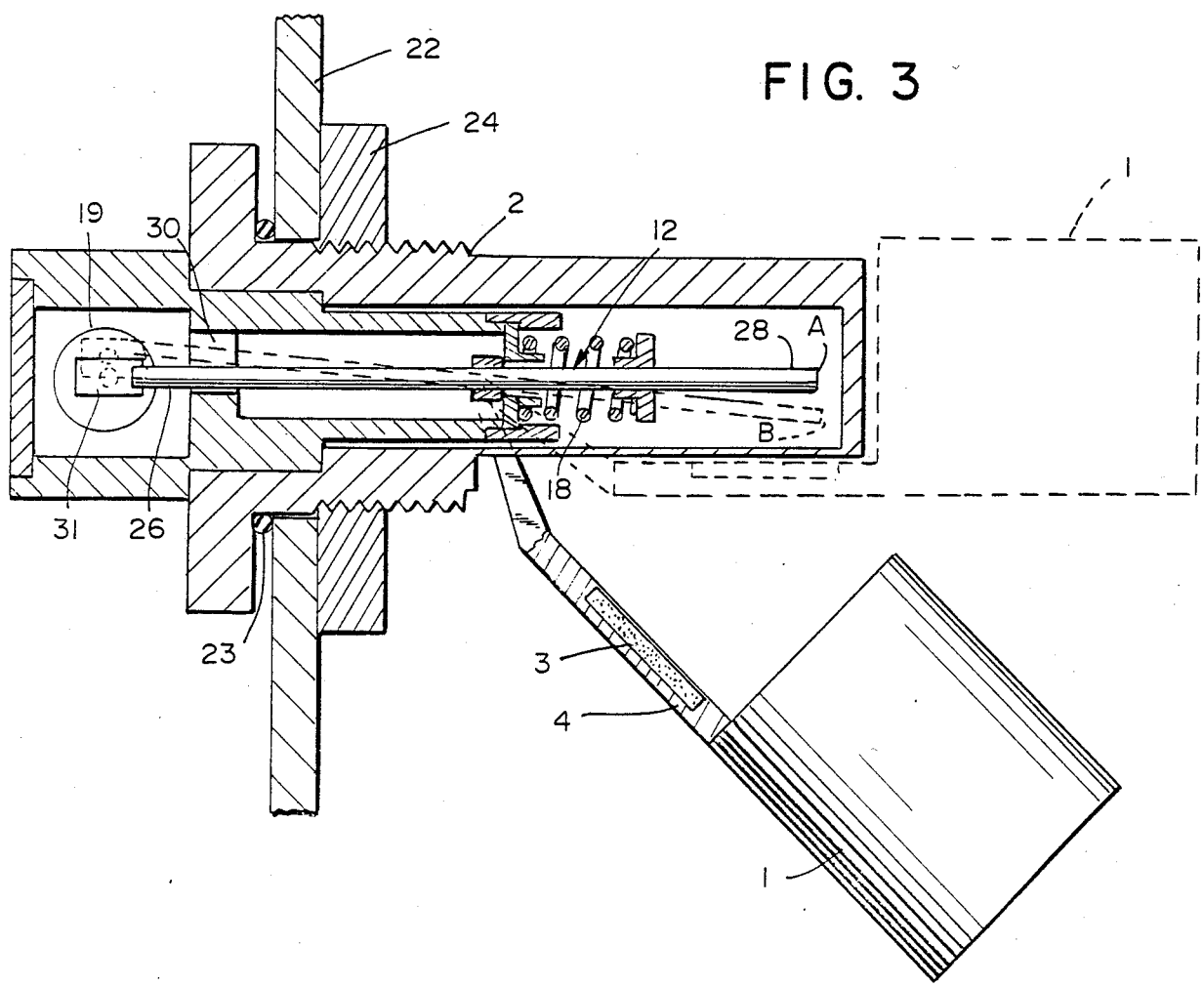
FIG. 3 is a side elevational view, partly broken away and partly in section, taken along line 3—3 of FIG. 2.

FIG. 3 describes a shutter 31 attached to shaft 12 wherein a face of the shutter is perpendicular to an end face of the shaft. Two fiber optic cables, in contrast to that of FIG. 1, enter coupler 19 from different sides and at orthogonal angles to that of the shaft and shutter. When shaft 12 is in the at rest position, an opaque shutter will interrupt the circuit preventing light transmission between fiber optic cables 32 and 33. Under attraction of magnet 3, the shaft will be drawn into the activated position causing displacement of the shutter. Light will then be able to transmit between cables 32 and 33 closing the circuit.

Figure 4:
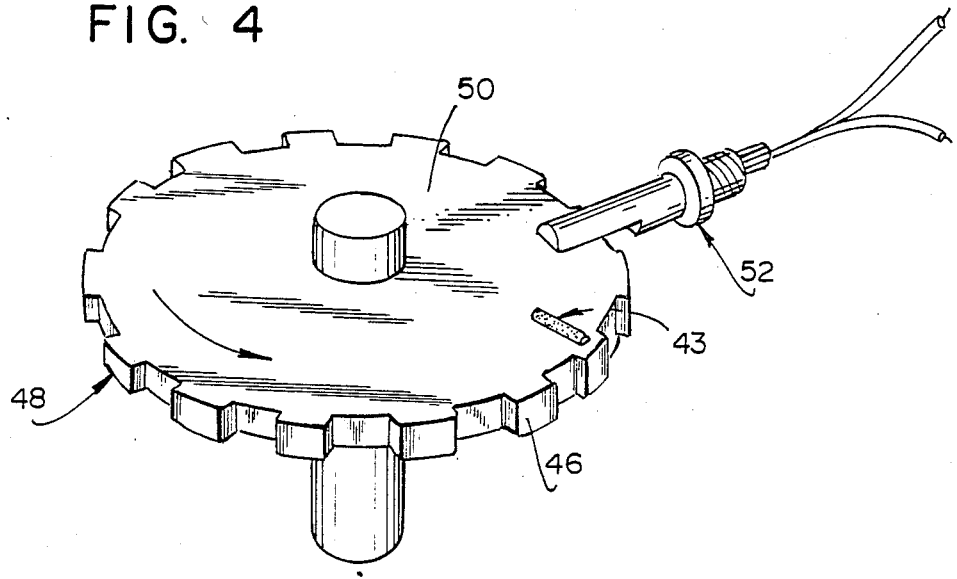
FIG. 4 is a top perspective view of an alternate embodiment of this invention describing application of the device to a piece of moving machinery.

The switch may also be used as a proximity sensor in a further embodiment of this invention, as depicted in FIG. 4. With this device the switch (absent the float) is arranged to sense a magnet permanently mounted on tooth member 46 of a moving gear wheel 50 which is part of a general piece of machinery 48. As the gear wheel 50 rotates, tooth member 46 with magnet 43 comes into proximity to switch 52, the latter being identical to the device of FIG. 1, but without float 1. At the point of maximum attraction between magnet 43 and shaft 12, the shaft moves into an activated position and shifts the reflector type shutter to open or close the fiber optic circuit. Besides gears, magnet 43 can be mounted upon a conveyor belt, a linkage arm, pulley or anywhere convenient to trigger the switch. In this manner, the switch may be used to detect movement, or count events simply by connecting the fiber optic cable to a logic circuit.

Figure 5:
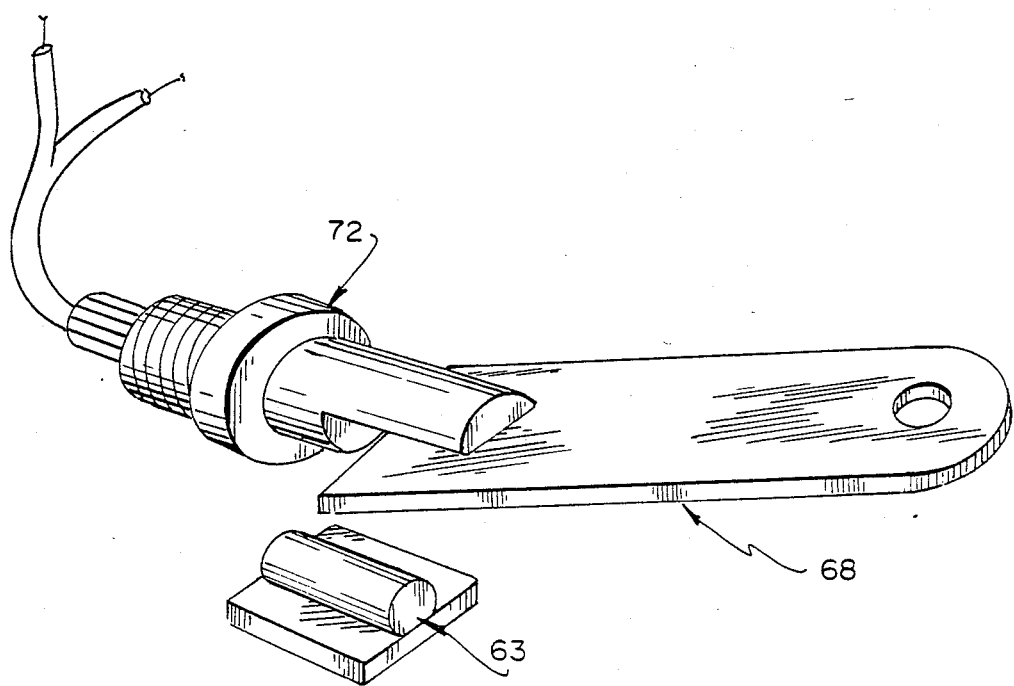
FIG. 5 is a perspective view of a further embodiment of this invention describing application of the device to another piece of moving machinery.

Similarly, the magnet may be mounted fixed near the sensor switch as in FIG. 5. Therein, a piece of iron 68 which is part of or attached to moving machinery will trigger the switch when it passes nearby. The iron 68 will weaken the magnetic field between sensor 72 (similar to housing assembly 2 of FIG. 1) and magnet 63 allowing the switch to operate as aforedescribed in connection with the FIG. 1 device. In use as a proximity sensor, the main body of the switch remains similar in construction to that of the float level switch while the magnetic interacting portion or float is modified for the specific application.

While preferred embodiments of the invention have been shown and described herein, it is obvious that numerous additions, changes and omissions may be made in such embodiments without departing from the spirit and scope of the invention.

What is claimed is:

1. A non-electrical switch for regulating passage of light through an optical fiber cable:
   a housing a encasing movement body circumscribed in spaced relation by the housing;

a shaft formed of paramagnetic material, its length describing a first and second section, said first section surrounded by said body and said second section extending outward of said body and the shaft having a longitudinal axis;

at least one optical fiber position adjacent to said movement body at a point remote from an exit point of said first shaft section out of said body;

a paramagnetic element situated outside said housing the paramagnetic element in spaced, substantially parallel relation with the longitudinal axis of the shaft a light intercepting surface attached to an end of said first section of said shaft and alienable with an end surface of said optical fiber; and a spring member communicating with said shaft to return said shaft from an activated position to a rest position whereby said shaft in the at rest position will pivot under influence of sufficient magnetic force toward a paramagnetic element situated outside said body and cause a shift in alignment of the light intercepting surface, the paramagnetic element in spaced parallel relation relation with the longitudinal axis of said shaft.

2. A switch according to claim 1 wherein said spring is extended in said activated position and unextended in said at rest position.

3. A switch according to claim 1 wherein said spring is extended in said at rest position and unextended in said activated position.

4. A switch according to claim 1 wherein said activated position results in said light intercepting surface being out of alignment with said end surface of said optical fiber.

5. A switch according to claim 1 wherein at least one of said optical fibers is positioned orthogonal to said shaft and said light intercepting surface.

6. A switch according to claim 1 wherein said paramagnetic element is iron.

7. A switch according to claim 1 wherein said light intercepting surface is opaque.

8. A switch according to claim 1 wherein said light intercepting surface is a mirror.

9. A switch according to claim 1 wherein said light intercepting surface is transparent.

10. A switch according to claim 1 wherein a major plane of said light reflecting surface is perpendicular to said shaft.

11. A switch according to claim 1 wherein a major plane of said light intercepting surface is parallel to said shaft.

12. A switch according to claim 1 wherein said shaft is a magnet.

13. A switch according to claim 1 wherein said paramagnetic element situated outside said body is a magnet.

14. A switch according to claim 13 wherein said magnet is part of an arm hingedly connecting a float to a housing carrying said encasing movement body.

15. A switch according to claim 13 wherein said magnet is mounted on a moving member of a gear wheel.

16. A switch according to claim 1 further including a float, the float having an extension arm, the extension arm having the paramagnetic element attached thereto.

17. A non-electrical liquid level detector switch for regulating passage of light through an optical fiber cable:

a housing a encasing movement body circumscribed in spaced relation by the housing;

a shaft formed of paramagnetic material, its length describing a first and second section, said first section surrounded by said body and said second section extending outward of said body and the shaft having a longitudinal axis;

at least one optical fiber positioned adjacent to said movement body at a point remote from an exit point of said first shaft section out of said body;

a paramagnetic element situated outside said housing the paramagnetic element in spaced, substantially parallel relation with the longitudinal axis of the shaft a light intercepting surface attached to an end of said first section of said shaft and alienable with an end surface of said optical fiber; and a spring member communicating with said shaft to return said shaft from an activated position to a rest position whereby said shaft in the at rest position will pivot under influence of a sufficient magnetic force toward a paramagnetic element situated outside said body and cause a shift in alignment of the light intercepting surface, the paramagnetic element being in spaced parallel relation relation with the longitudinal axis of said shaft and movement of the paramagnetic element is caused by a fluid which circumscribes a portion of the encasing movement body.

* * * * *